July 5, 1949. L. GESS 2,475,317
THERMOMETER FILLING SYSTEM
Filed Jan. 30, 1945
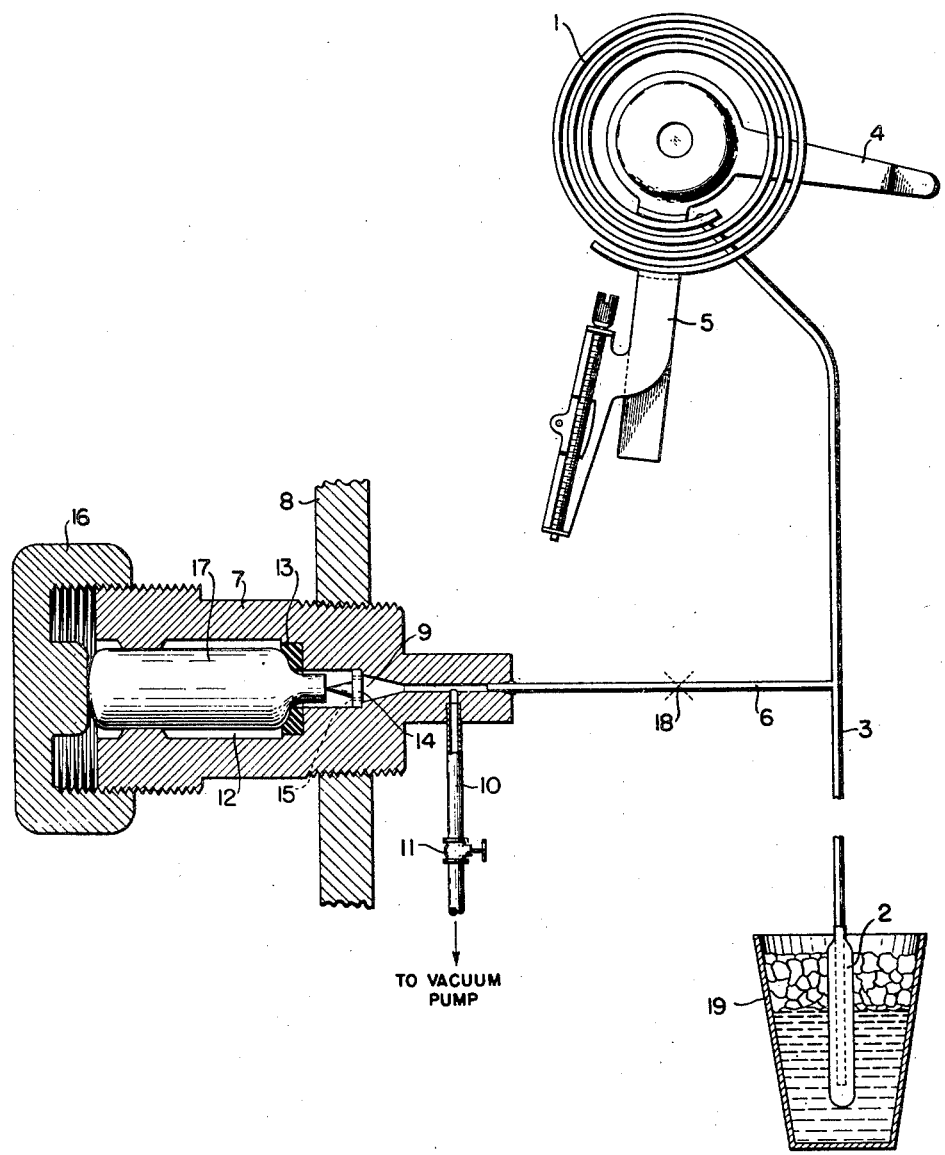
INVENTOR.
LOUIS GESS
BY
*C. B. Spangenberg*
ATTORNEY.

Patented July 5, 1949

2,475,317

UNITED STATES PATENT OFFICE 2,475,317

THERMOMETER FILLING SYSTEM

Louis Gess, Jenkintown, Pa., assignor, by mesne assignments, to Minneapolis-Honeywell Regulator Company, Minneapolis, Minn., a corporation of Delaware Application January 30, 1945, Serial No. 575,268

3 Claims. (Cl. 226—73)

The present invention relates to temperature measuring systems, and more particularly to a method and apparatus for filling the thermal system of a vapor-pressure type thermometer.

The action of a vapor-pressure thermometer depends upon the fact that the pressure inside the thermal system, consisting of a Bourdon tube and a bulb connected by a capillary tube of suitable length, is determined solely by the temperature of a free surface of the liquid. It follows, therefore, that the system must be so constructed that one free surface is always in the bulb. If this condition is fulfilled, the reading of the instrument is not sensibly affected by changes in temperature of the Bourdon tube and the capillary. Since the filling of a system of this type is critical, it is necessary that a predetermined quantity of the volatile liquid used be placed therein. This has previously required the use of an elaborate manifold system employing glass reservoirs in order that the amount admitted can be measured. This is not only difficult to do accurately, but is dangerous due to possible breakage of the glass reservoirs because of the high pressures generated by volatile liquids even at atmospheric temperatures.

It is an object of the invention to eliminate the difficulties mentioned above and provide a simple method and apparatus for filling the thermal system of a vapor pressure thermometer. It is a further object of the invention to provide apparatus by means of which a charge consisting of a predetermined amount of the volatile liquid used may be inserted in the actuating mechanism of a thermometer.

The volume of liquid that is used will vary with the size of the Bourdon tube and bulb and with the length of capillary used. In any case, however, it will be sufficient to fill the Bourdon tube, the capillary, and a portion of the bulb. The kind of liquid used will depend upon the temperature range for which the instrument is designed.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

The single figure of the drawing shows, partly in section, one form that the invention may take.

There is shown in the drawing a thermal system consisting of a Bourdon tube 1 and a bulb 2 that are connected by a capillary 3 of suitable length, depending upon the use to which the system is to be placed. The tube 1 is shown as being attached at its inner end to a support 4 by means of which it can be mounted in an instrument casing. Fastened to the outer end of the tube and adapted to be moved by the tube as it expands and contracts is a driving member 5. This member, operating through a suitable linkage, moves an exhibiting element to indicate the temperature to which the bulb 2 is subjected. The capillary tube 3 has a branch 6 through which the system may be evacuated and filled. The outer end of the tube 6 is fastened by some means, such as soldering, in an opening provided in a fixture 7 that is fastened in a suitable support 8.

As shown the fixture is provided with a passage 9, the outer end of which receives the branch tube 6. This passage also has an opening in which is fastened a pipe 10 having a valve 11 in it. The pipe is connected with a vacuum pump by means of which the thermal system may be evacuated prior to the time that it is filled. The fixture 7 is also formed with an enlarged chamber 12 which is in direct communication with and in effect forms an extension of the passage 9. Between the passage and the chamber there is a recess in which is inserted a resilient gasket 13, the purpose of which will be described later. Located in the passage 9 at a predetermined distance beyond the edge of the shoulder is a piercing member 14 that has openings 15 formed in it so that the passage on both sides of this piercing member is open. The outer edge of the fixture has screw threads formed on it so that a cap 16 may be mounted thereon and may be rotated to move the cap further on the fixture for the purpose of properly positioning a filling capsule 17 in the chamber with respect to the gasket 13 and piercing member 14.

In a vapor-pressure type of thermometer the amount of filling medium that is placed in the thermal system is critical since there must be enough of this filling medium to fill the Bourdon tube and the capillary and a portion of the bulb. The operation of a thermal system of this type depends upon the vapor-pressure which is produced as a result of the heat to which the bulb is subjected with this pressure acting against the surface of the liquid that is located in the bulb. If enough liquid is not inserted in the system, it may be that the liquid-gas surface will be in the capillary so that the temperature indicated by the system will be considerably lower than the temperature to which the bulb is subjected. If too much liquid is inserted in a system of this type, the liquid-gas surface will not be available and the thermometer will act as a liquid filled thermometer and will have entirely different characteristics from the vapor-pressure type. Therefore, the applicant provides a filling capsule 17 which is filled with the proper amount of liquid for the thermal system which is being used. Ordinarily the bulb and Bourdon tubes of these thermal systems come in standard sizes, the only difference being in the length of the capillary that is used between the Bourdon tube and the bulb. The diameter of this capillary is so small that considerable leeway may be taken as to its length without materially affecting the location of the liquid-gas surface in the thermometer bulb. It is, therefore, economical to fill a large number of capsules 17 with the proper amount of liquid and use these capsules to fill the thermal systems.

When operating the apparatus in the method contemplated by the applicant a thermal system is mounted with its extension tube 6 securely fastened as by soldering in the fixture 7. A capsule 17 is then placed in the chamber 12 and the cap 16 is screwed down until a pressure tight joint is obtained between the capsule and the gasket 13. The system is then air tight and the valve 11 may be opened to permit the vacuum pump to exhaust the system to the proper point. The bulb 2 may be heated while this is taking place, if desired, to assist in driving the moisture out of the system. Upon the completion of the evacuating step, the valve 11 is closed and the cap 16 is further screwed down until the end of the capsule 17 is pierced by the point of the piercing member 14. The volatile liquid in the capsule will then expand into the thermal system. Since it is probable that the entire system will be at room temperature, all of the liquid might not pass into the thermal system unless some additional means is used to cause this to happen. Accordingly the bulb 2, which is the largest reservoir in the system, is immersed in an ice bath 19 or some other suitably cold bath so that the vapor passing into the thermal system will be condensed at that point. The vaporizing of the liquid in the capsule 17 and its condensation in the bulb 2 continues until such time as all of the filling medium has passed into the thermal system. This time can be computed or can be determined by trial and error and will be approximately the same for each system depending upon the temperature of the bath in which the bulb 2 is immersed. After the liquid has all condensed in the bulb 2, the capillary 6 is cut at 18 and is sealed to close the thermal system. Thereafter by heating up the bulb 2 the liquid will be vaporized and will be forced to the upper portion of the system, which consists of the spiral 1 and the capillary 3 where it will condense, leaving the desired liquid-gas surface in the bulb 2 above the end of the capillary. It is well-known of course, that the type of filling medium used depends upon the range for which the instrument is designed. In any event the bulb will always be the hottest portion of any vapor-pressure thermal system of this type, so that the liquid-gas surface of this system will always be kept in the bulb. After the thermal system has been filled, it is properly aged and calibrated.

The end of the tube 6 which remained in the fixture 7 after the cutting operation can be removed and a new thermal system attached thereto in its place. The used capsule 17 will be removed and a new one inserted in its place. Thereafter the apparatus is again ready for the filling of another thermal system. It will be seen that there are a minimum of operations involved and that the apparatus used is rugged. Accordingly thermal systems of the vapor-tension type may be readily and quickly filled with the exact amount of liquid which is required for each system, and the filling may be done in a minimum amount of time.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. The method of filling a thermal system consisting of a Bourdon tube, a bulb and a connecting capillary tube comprising the steps of attaching the thermal system and a capsule containing the proper amount of filling medium for the thermal system to a suitable fixture and in pressure tight relation thereto, evacuating the thermal system, piercing the capsule while maintaining the pressure tight relation to let the filling medium flow from the capsule to the thermal system, and cooling the bulb below the temperature of the remainder of the system during the filling operation.

2. The method of filling a vapor pressure thermal system comprising a bulb, a Bourdon tube and a capillary connecting the two which includes the steps of attaching the thermal system to a fixture, placing a capsule containing a measured amount of fluid in the fixture, evacuating the thermal system through the fixture, puncturing the capsule while maintaining the vacuum in the system to permit the fluid therein to flow into the thermal system, and cooling a portion of the thermal system while fluid is flowing into it to condense the fluid in that portion of the thermal system.

3. In an apparatus for filling a thermal system, a fixture having a plurality of connected passageways, means to attach a thermal system to one of said passageways, another of said passageways being adapted to be connected to a device to evacuate said thermal system, a valve in said last mentioned passageway, means to force a capsule containing the correct amount of fluid for said thermal system into pressure tight and communicating relation with said passageways whereby when the thermal system has been evacuated the fluid in the capsule may flow into the thermal system, and means for cooling a portion of the thermal system while it is being filled to condense the fluid therein.

LOUIS GESS.

REFERENCES CITED

The following references are of record in the file of this patent:

UNITED STATES PATENTS

| Number | Name | Date |
| --- | --- | --- |
| 1,801,210 | Schlaich | Apr. 14, 1931 |
| 2,126,532 | Cate | Aug. 9, 1938 |
| 2,189,643 | Ward | Feb. 6, 1940 |
| 2,218,931 | Carlson | Oct. 22, 1940 |
| 2,347,010 | Ward | Apr. 18, 1944 |